C. F. OVERLY.
ROTARY MOTOR.
APPLICATION FILED JAN. 19, 1912.

1,104,070.

Patented July 21, 1914.

2 SHEETS—SHEET 1.

Witnesses
Grover Ilgen
Virgil Baker.

Inventor
Charles F. Overly
By Percy Norton
Attorney

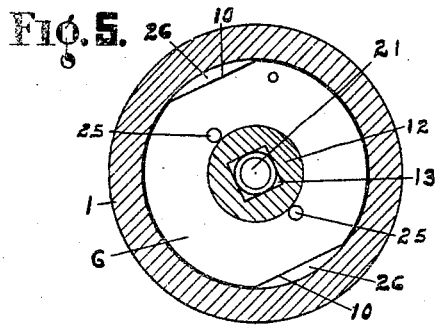
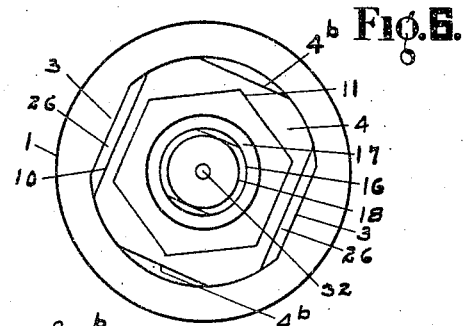
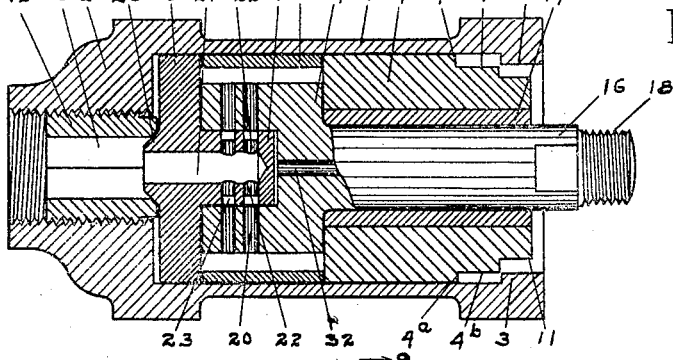
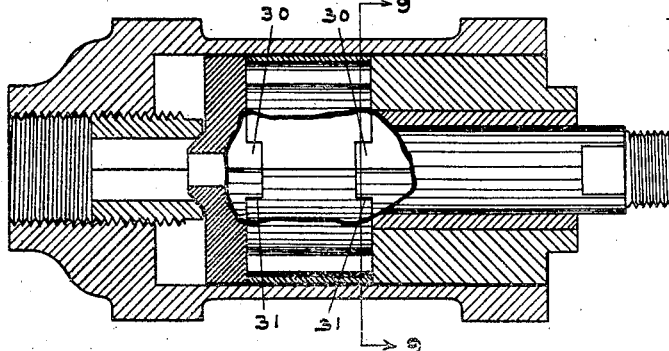
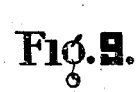

UNITED STATES PATENT OFFICE.

CHARLES F. OVERLY, OF PITTSBURGH, PENNSYLVANIA, ASSIGNOR TO THE LAGONDA MANUFACTURING COMPANY, OF SPRINGFIELD, OHIO, A CORPORATION OF OHIO.

ROTARY MOTOR.

1,104,070.   Specification of Letters Patent.   Patented July 21, 1914.

Application filed January 19, 1912. Serial No. 672,247.

*To all whom it may concern:*

Be it known that I, CHARLES F. OVERLY, a citizen of the United States, residing at Pittsburgh, in the county of Allegheny and State of Pennsylvania, have invented certain new and useful Improvements in Rotary Motors, of which the following is a specification, reference being had therein to the accompanying drawings.

My invention relates to rotary motors and more particularly to a motor of this class that is adapted to drive boiler tube cleaners, although it may be used for other purposes.

The object of my invention is to provide a simple, strong and efficient motor of few parts that can be easily assembled and readily taken apart for renewal or repairs.

With these and other objects in view my invention consists of the constructions and combinations hereinafter described and set forth in the claims.

Figure 1:
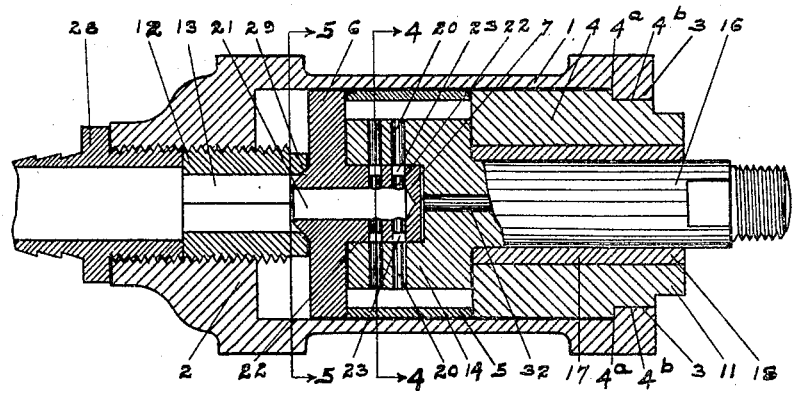
Figure 2:
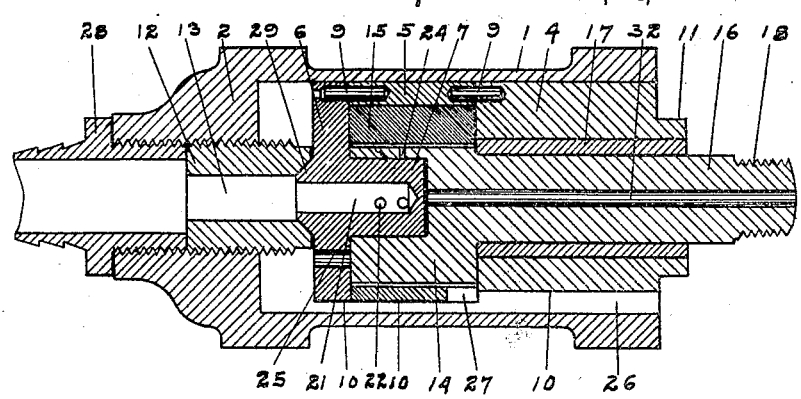
Figure 3:
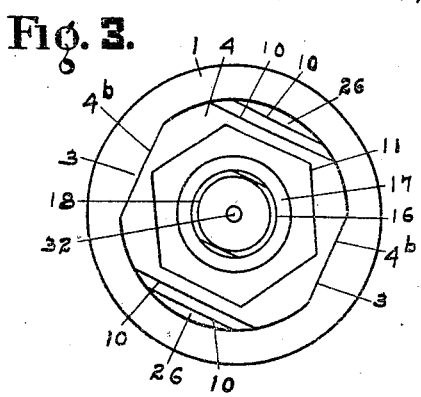
Figure 4:
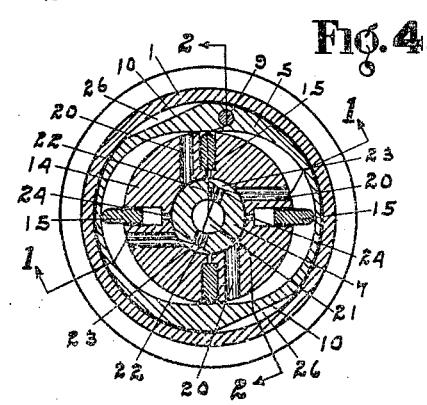

In the accompanying drawings which form a part of this specification Figure 1 is a longitudinal section of a motor embodying my invention, said section being taken on the line 1—1 of Fig. 4. Fig. 2 is a like section taken on the line 2—2 of Fig. 4. Fig. 3 is an end view of Fig. 1 showing the parts in assembled, working position. Fig. 4 is a cross-section on the line 4—4 of Fig. 1. Fig. 5 is a cross-section on the line 5—5 of Fig. 1. Fig. 6 is another end view of Fig. 1 showing the internal parts in position to be taken from the casing. Fig. 7 is a longitudinal section taken in the same plane as Fig. 1 and shows the internal parts moved rearward in the casing ready to be given a quarter turn to take the same from the casing. Fig. 8 is a longitudinal section on the line 8—8 of Fig. 9 partially shown in elevation to illustrate a modified form of securing certain parts together, and Fig. 9 is a cross-section on the line 9—9 of Fig. 8.

Like numerals represent the same parts in the several views.

In the drawings 1 represents a casing open at its front end and preferably having an integral head 2 at its rear end. Said open end is provided with one or more inwardly extending projections 3 which I have shown in the form of segments. A motor bearing member 4, a motor cylinder 5 and a disk or partition 6 are secured together by dowel-pins 9 and have oppositely disposed flattened portions 10 formed to the inwardly extending segmental projections 3 so that when said motor cylinder, disk or partition and motor bearing member are assembled they can be inserted through the open front end of the casing, the flattened portions passing the projections 3 and when they reach the position shown in Fig. 7 they are given a quarter turn by applying a wrench to the hex extension 11 on the motor bearing member 4 and the parts are then moved forward until shoulders 4ª of said last named member abut against the rear side of the projections 3. The shoulders 4ª are formed by oppositely disposed flattened portions 4ᵇ extending from the front end of the motor bearing member 4 rearwardly a distance equal to the width of the projections 3 so that when the motor bearing member is inserted in the casing, quarter turned and moved forward the flattened portions 4ᵇ will abut the inner sides of the projections 3 and keep the motor bearing member from turning in the casing.

A plug 12 screw-threaded in an opening through the head 2 can be moved against the rear side of the disk or ported partition 6 by a suitable wrench applied in the angular supply opening 13 to clamp said disk or partition, motor cylinder and motor bearing member against the inner side of the projections 3 and hold said parts in place. It will be seen there is sufficient clearance between the disk or partition 6 and the head 2 for the rearward and forward movement of the motor cylinder, disk or partition and motor bearing member to insert and secure said parts in place within the casing as described.

I have shown the motor cylinder of such dimensions that when the rotary motor member 14 is mounted therein it will contact with the walls of the chamber in two places opposite each other forming two oppositely disposed crescent shaped chambers as particularly shown in Fig. 4. Piston blades 15 seated in recesses in the rotary motor member are adapted to move radially into the crescent shaped chambers in a well known manner.

The disk or partition 6 has a projecting portion 7 extending within an axial recess of the rotary motor member and forms a bearing to carry the rear end of said member. Said rotary motor member is provided with a forwardly extending portion or shaft 16 journaled in the bearing member 4, a removable bushing 17 being preferably employed; and said shaft is screw-threaded at 18 to attach the tool to be driven.

The motive agent is admitted to the crescent shaped chambers in the rear of the piston blades through inlet ports 20; and the disk or partition 6 is provided with an inlet 21 having ports 22 through its projecting portion 7 adapted to register with the ports 20 in the rotary motor member, said projecting portion 7 having transverse slots 23 through which the ports 22 open to the ports 20 as particularly shown in Fig. 4. Ports or openings 24 in the rotary motor member admit the pressure of the motive agent to the bottom of the recesses for the piston blades 15 to force them outwardly and when they are being forced inwardly by contact with the curve of the motor cylinder, openings 25 in the disk or partition 6 relieve the pressure in the recesses behind the blades. Passages 26 formed between the flattened portions 10 of the disk or partition 6, the motor cylinder 5 and the motor bearing member 4 and the casing receive and discharge the motive agent from the openings 25 and from exhaust ports 27 in the motor cylinder. A supply coupling 28 is screw-threaded in the opening in the head 2; and the contacting portions of the plug 12 and disk or partition 6 are preferably beveled at 29 as shown to form a better joint and to center the disk or partition in the casing.

In Fig. 8 I have shown a modification in which the disk or partition 6 and the motor bearing member 4 are provided with tongues 30 seated in grooves 31 of the motor cylinder to hold said parts in proper relation with each other. A vent 32 leads from the axial recess in the rotary motor member through the shaft to the atmosphere.

Having thus described my invention I claim:

1. In a rotary motor, a casing having an open end with a projection extending inwardly from an arc of the circle of its bore forming a shoulder therein, a motor bearing member fitted to said bore and having a reduced portion throughout its length adapting it to entirely pass said projection and means including a screw-plug to clamp said member against said shoulder, substantially as described.

2. In a rotary motor, a casing having an open end with a projection extending inwardly from an arc of the circle of its bore forming a shoulder therein, a motor cylinder and a motor bearing member with means to fix same in their relation to each other, said cylinder and bearing member being fitted to said bore and each having a reduced portion throughout its length adapting it to entirely pass said projection and means including a screw-plug to clamp said cylinder and bearing member in place with said bearing member against said shoulder, substantially as described.

3. In a rotary motor, a casing having an open end with a projection extending inwardly from an arc of the circle of its bore forming a shoulder therein, a rotary motor member, motor bearing members on opposite sides of said rotary motor member fitted to said bore and each having a reduced portion throughout its length adapting it to entirely pass said projection and means including a screw-plug to clamp said bearing members in place with one of them against said shoulder, substantially as described.

4. In a rotary motor, a casing having an open end with a projection extending inwardly from an arc of the circle of its bore forming a shoulder therein, a rotary motor member, a motor cylinder and motor bearing members at the respective ends thereof with means to fix said cylinder and bearing members in their relation to each other, said cylinder and bearing members being fitted to said bore and each having a reduced portion throughout its length adapting it to entirely pass said projection and means including a screw-plug to clamp said cylinder and bearing members in place with one of said bearing members against said shoulder, substantially as described.

5. In a rotary motor, a casing having a bore with an integral head at one end and open at its opposite end with a projection extending inwardly from one or more arcs of the circle of its bore forming a shoulder or shoulders therein, a motor bearing member fitted to said bore and having a reduced portion throughout its length adapting it to entirely pass said projection or projections and means including a screw-plug to clamp said bearing member against said shoulder or shoulders, substantially as described.

6. In a rotary motor, a casing having an open end with a projection extending inwardly from an arc of the circle of its bore, a motor bearing member fitted to said bore and having a reduced portion throughout its length adapting it to entirely pass said projection, said bearing member also having a reduced portion for a part of its length adapting it to engage the rear and inner sides of said projection and means including a screw-plug to clamp said bearing member in place, substantially as described.

7. In a rotary motor, a casing having an open end with a projection extending inwardly from an arc of the circle of its bore, a rotary motor member, a motor cylinder and motor bearing members at the respective ends thereof secured thereto, said cylinder and bearing members fitted to said bore and each having a reduced portion throughout its length adapting it to entirely pass said projection, one of said bearing members also having a reduced portion for a part of its length adapting it to engage the rear and inner sides of said projection and means including a screw-plug to clamp said cylinder and bearing members in place, substantially as described.

8. In a rotary motor, a casing having an open end with a projection extending inwardly from an arc of the circle of its bore forming a shoulder therein, a motor bearing member fitted to said bore and having a reduced or cut-away portion throughout its length adapting it to entirely pass said projection and form with said casing an exhaust passage and means including a screw-plug to clamp said bearing member against said shoulder, substantially as described.

9. In a rotary motor, a casing having a bore with an integral supply head at one end and open at its opposite end with one or more inwardly extending projections, a rotary motor member, a motor cylinder, motor bearing members on opposite sides of said rotary motor member, said cylinder and bearing members fitted to said bore and each having reduced portions adapting it to be introduced through said open end into said bore to form with said casing an exhaust passage through said open end, one of said bearing members having outlet ports to said passage to relieve the pressure in the rear of said blades when the blades are pressed inwardly by contact with the walls of said cylinder and a screw-plug to force said cylinder and bearing members forward to engage the front bearing with the rear side of said projections, substantially as described.

10. In a rotary motor, a casing having a bore with an integral supply head at one end and open at its opposite end with one or more inwardly extending segmental projections, a rotary motor member, a motor cylinder, motor bearing members on opposite sides of said rotary motor member, said cylinder and bearing members fitted to said bore and each having reduced portions adapting it to pass said projection or projections and form with said casing an exhaust passage through said open end, the front bearing member also having a reduced portion for a part of its length and a screw plug to force said cylinder and bearing members forward to engage the front bearing with the inner and rear sides of said projections, substantially as described.

In testimony whereof I have hereunto affixed my signature in the presence of two witnesses.

CHARLES F. OVERLY.

Witnesses:
JAMES H. JOHNSTON,
MARGE M. DANAHY.